United States Patent
Van Leeuwen

(10) Patent No.: US 8,042,044 B2
(45) Date of Patent: Oct. 18, 2011

(54) USER INTERFACE WITH DISPLACED REPRESENTATION OF TOUCH AREA

(75) Inventor: Marco Van Leeuwen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1574 days.

(21) Appl. No.: 10/536,223

(22) PCT Filed: Nov. 26, 2003

(86) PCT No.: PCT/IB03/06332
§ 371 (c)(1),
(2), (4) Date: May 24, 2005

(87) PCT Pub. No.: WO2004/051392
PCT Pub. Date: Jun. 17, 2004

(65) Prior Publication Data
US 2006/0161846 A1    Jul. 20, 2006

(30) Foreign Application Priority Data
Nov. 29, 2002   (EP) ..................................... 02079993

(51) Int. Cl.
*G09G 5/08* (2006.01)

(52) U.S. Cl. .......................... 715/702; 345/157; 345/173
(58) Field of Classification Search .................. 715/702, 715/701; 345/173, 701, 702, 339, 130, 439, 345/157
See application file for complete search history.

(56) References Cited

U.S. PATENT DOCUMENTS

| 6,211,856 | B1 | 4/2001 | Choi et al. | |
| 6,988,246 | B2 * | 1/2006 | Kopitzke et al. | 715/810 |
| 2005/0235205 | A1 * | 10/2005 | Hasegawa | 715/702 |
| 2006/0005131 | A1 * | 1/2006 | Tao | 715/702 |

FOREIGN PATENT DOCUMENTS

| WO | WO9429788 A1 | 12/1994 |
| WO | WO0075766 A1 | 12/2000 |

* cited by examiner

*Primary Examiner* — William L Bashore
*Assistant Examiner* — Meseker Takele

(57) ABSTRACT

The invention relates to a data processing system comprising a display screen (102), a graphical user interface for displaying objects on the display screen, and detection means (102) for detecting a touch position of a pointing object (103) on the display screen. The detection means (102) is capable of measuring a distance between the pointing object and the display screen. A property of the displayed objects is dependent on the measured distance between the pointing object and the display screen.

17 Claims, 4 Drawing Sheets

USER INTERFACE WITH DISPLACED REPRESENTATION OF TOUCH AREA

FIELD OF THE INVENTION

The invention relates to a data processing system comprising a display screen, a graphical user interface for displaying objects on the display screen, and detection means for detecting a touch position of a pointing object on the display screen.

The invention further relates to a method of enabling a user to interact with a data processing system, the method comprising a step of displaying objects on a display screen, and a step of detecting a touch position of a pointing object on the display screen.

The invention further relates to a computer program product for performing the steps of the above method.

BACKGROUND OF THE INVENTION

Touch screens are widely applied today. The best known example of such a data processing system is the personal digital assistant (PDA) which is a compact personal computer providing a graphical screen for displaying objects of a graphical user interface, such as text strings and hyperlinks, graphical buttons, etc. In general, PDA's are not standard provided with a keyboard and/or mouse, but instead have a touch-sensitive display screen enabling a user to interact with the system. By touching the screen with a finger or stylus, the user can position a cursor within an application screen, press graphical buttons or draw characters on the screen. Increasingly, also other types of—mostly portable—devices are equipped with a touch screen, such as mobile phones or programmable remote controls.

Some tasks, such as entering text or making selections from lists are notoriously difficult on these kinds of devices. Most PDA's offer handwriting recognition, but this is still an unreliable technology. A widely applied solution is a virtual keyboard, which is a graphical representation of a computer keyboard displayed on the touch screen of the device, wherein each key is represented by a tiny button. The user can successively touch these buttons in order to enter the corresponding characters. Generally, such buttons are too small to be operated with a finger, which necessitates the use of a stylus. This problem can be solved to some extent by applying a zooming mechanism which, in response to touching the touch screen magnifies the objects displayed in the area around the touch position. An example of such a system with 'auto zoom' function is disclosed in U.S. Pat. No. 6,211,856. Such a system enables a user to operate small buttons or other objects, e.g. hyperlinks, without the need for a stylus and with increased accuracy.

OBJECT AND SUMMARY OF THE INVENTION

It is an object of the invention to provide an improved system and method of the type defined in the opening paragraph. To this end, in the system according to the invention, the detection means is capable of measuring a distance between the pointing object (for example a stylus or a finger) and the display screen, wherein a property of the displayed objects is dependent on the measured distance between the pointing object and the display screen. In such a system, the display of the objects is altered dependent on the distance of the pointing object from the display screen. This has the advantage that the user gets an early feedback on which object is targeted to be touched. This enables the user to perform a corrective action during the movement towards the screen if this early feedback indicates that the user is not pointing to the intended object but to an object near to the intended object. For example, if a representation of a keyboard is displayed, the key of the keyboard the user is pointing to may be highlighted. Or, to improve the easy of selecting a key, the area of the keyboard to which the user is pointing to may be magnified, the magnification factor being dependent on the distance. Many alternative possibilities exist to change a property of the displayed objects depended on the distance between the pointing object and the screen. Of course, this idea is also valid if another user interface than a representation of a keyboard is displayed.

In an embodiment of the system according to the invention, the graphical user interface is arranged to display, at a distance from the touch position, a representation of objects displayed in an area around the touch position. In this way, it is achieved that the user can interact with the system in a more convenient manner. A drawback of any touch screen based system is that, while interacting with the system, the pointing object partially or completely covers the objects around the touch position. Especially if the pointing object is a user's finger and the objects displayed in the area around the touch position are small, this severely disturbs the interaction. In the system in accordance with this embodiment of the invention, a representation of objects around the touch position, which are very likely to be partially concealed by the pointing object, is displayed elsewhere on the display screen at a location which is less likely to be concealed by the pointing object. Consequently, the user can see an undisturbed picture of the area concealed by his finger or stylus just before and during touching of the screen, including any visual response on the touch such as the highlighting of a button or hyperlink. Consequently, the user can take corrective action, if necessary, before releasing the display screen and thus activating the function corresponding to the touch position.

The detection means which measure the distance between the pointing object and the display screen control the graphical user interface to change a property of the representation dependent on the measured distance between the pointing object and the display screen. Examples of such a dependent property are: magnification, transparency, distance to the touch position, color saturation, etc.

In an embodiment of the system according to the invention, the displaying of the representation can be animated to clearly show the relationship between the act of touching the screen and the displaying of the representation of the area around the touch position.

In an embodiment of the system according to the invention, when the pointing object, e.g. a stylus or the user's finger, is initially detected at some distance from the screen, the system may estimate where the display screen will actually be touched, generate a representation of the area around that estimated touch position, and display the representation with initial properties, preferably properties which make the representation relatively non-disturbing, e.g. in a semi-transparent way and/or with a low magnification factor. As the pointing object approaches the display screen, the properties may be gradually or stepwise changed to make the representation more conspicuous, e.g. less transparent and with a higher magnification factor.

In an embodiment of the system according to the invention, the distance between the representation and the touch position (or the expected touch position) is changed in dependence upon the measured distance between the pointing object and the screen. For example, the representation may initially be displayed close to the predicted touch position, and move away from the predicted touch position as the pointing object further approaches the screen. The user's attention is thus drawn to the representation, moving to its final position.

In an embodiment of the system according to the invention, the representation comprises a magnified version of the area around the touch position. In this way, the user gets an even better impression of the area concealed by the pointing object. The magnified version might even display details which are not displayed in the area around the touch position, to facilitate the positioning of the pointing object.

In an embodiment of the system according to the invention, the representation comprises an indication of the touch position. For example, the representation may comprise a crosshair the center of which indicates the precise touch position. Alternatively, the representation may comprise the contour of a stylus or finger, the point of which is displayed at a position in the representation which corresponds to the touch position. In this way, the user is enabled to position the pointer object in a highly accurate manner. The displayed indication may resemble a stylus or pointer in dependence upon the pointing object used or may resemble either of them, irrespective of the pointing object used. The type of pointing object may be determined, for example, by the system by measuring the touched area. If this area is relatively small, the user is probably using a stylus, while otherwise the user is probably using his finger. Also, the orientation of the displayed indication may or may not correspond to the actual orientation. The actual orientation may be derived, for example, from the shape of the touch area, e.g. if the shape is oval, the longest axis probably corresponds to the orientation of the pointing object, or by means of light sensors adjacent the display screen, or even a small camera. The orientation may also be set by the user, e.g. a left-handed user may prefer an orientation in the top-right direction.

In an embodiment of the system according to the invention the position of the representation relative to the touch position is determined by the touch position. The representation is preferably displayed in the neighborhood of the touch position, so that the user does not need to shift his focus of attention too much. If the touch position is somewhere in the middle of the display screen, the representation can be displayed in any desired position relative to the touch position, for example, a short distance above or to the left of the touch position. However, if the touch position is near a border of the display screen, displaying the representation at the default position may become difficult or even impossible. In that case, the representation may be displayed in a more appropriate relative position which offers more room for the representation. For example, if the touch position is near the left border of the display screen, the representation may be displayed to the right of the touch position, even if the default position is to the left of the touch position.

In another embodiment of the system according to the invention, the position of the representation is determined by the user. For example, if the user is left-handed, he may prefer to display the representation at the right side of the touch position because otherwise the representation is likely to be covered by his hand. Alternatively, the user may choose the representation to be always displayed in a particular corner of the display screen, say the top left corner.

In another embodiment of the system according to the invention, the representation of the area around the touch position at a predetermined distance from the touch position is displayed during a predetermined period of time, even if the pointing object is not anymore indicating this touch position. This allows the user to move the pointing object to the representation which is displayed at a predetermined distance from the touch position. It is much easier for the user to select the correct object within the magnified representation than in the original representation.

In another embodiment of the system according to the invention, the representation is combined with a restriction to the extent to which the touch position can be corrected. For example, the initially selected object can only be changed to the objects which are comprised in the representation. Consequently, during the correction, the displayed content of the representation does not completely shift along with the pointing object, but only the indication of the selected object and/or the indication of the pointing object may shift relative to the representation. This has the advantage that the user can drag the painting object form the original touch area to the representation without losing the relevant objects in the representation. This is especially useful of the representation is an enlarged version of the original objects.

The invention is particularly suitable for portable devices such as PDA's and touch screen remote controls. However, the invention is equally well applicable to any other data processing systems, such as personal computers and notebooks, when equipped with a touch screen. A particular advantage of the present invention is that the touch area itself can remain unchanged, so confusion with the user when approaching the desired touch position is avoided. Instead, the representation of the touch area is displayed at some distance of the touch position, thus providing the user with a clear overview of the touch area without disturbing the touch area itself, e.g. by magnification. The area to be represented may be rectangular, but may equally well be circular or have any other desired shape.

BRIEF DESCRIPTION OF THE DRAWINGS

These and other aspects of the invention are apparent from and will be elucidated, by way of a non-limitative example, with reference to the embodiment(s) described hereinafter. In the drawings.

DESCRIPTION OF EMBODIMENTS

Figure 1:
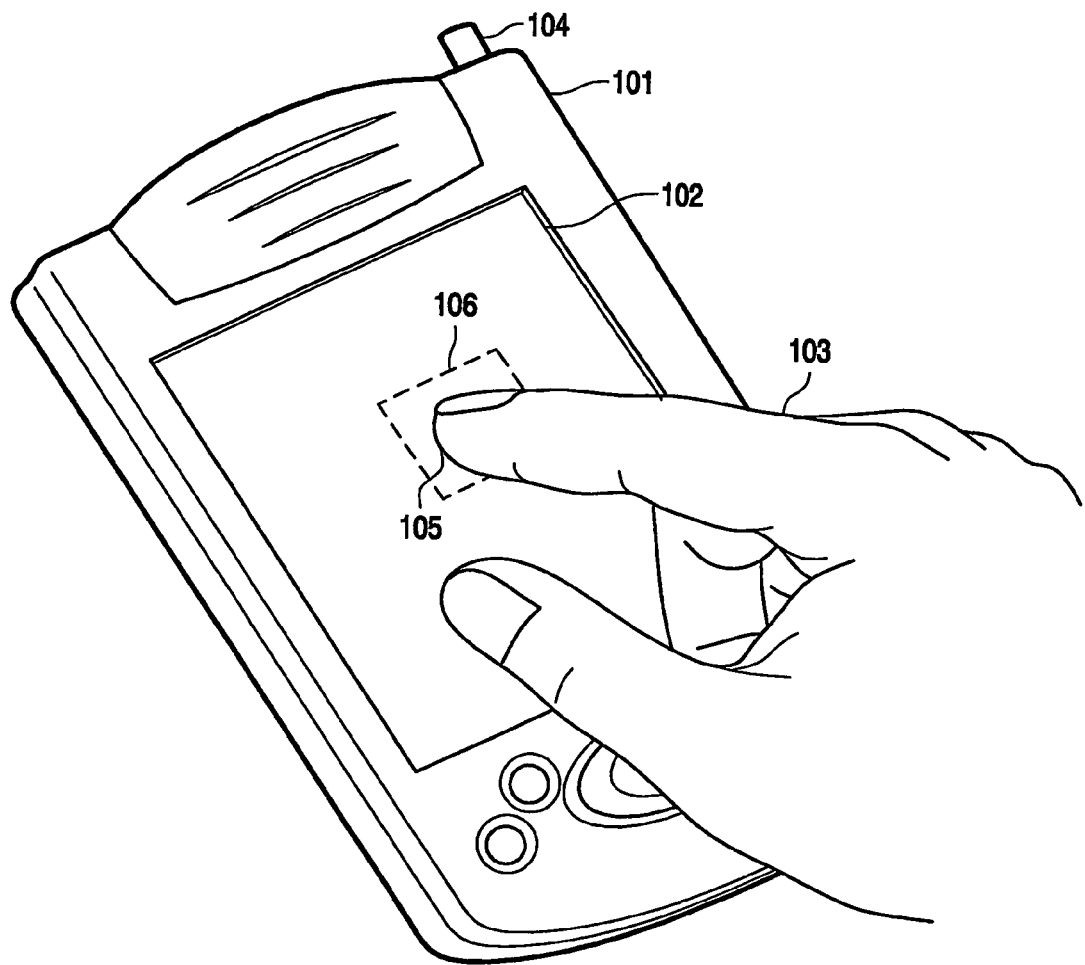
FIG. 1 shows a personal digital assistant as a data processing system embodying the invention.

Throughout the Figures, the same reference numerals indicate similar or corresponding features. FIG. 1 shows a personal digital assistant (PDA) 101 as a data processing system embodying the invention. The PDA 101 comprises a touch sensitive display screen 102, capable of displaying objects of a graphical user interface and enabling the user to interact with an interactive application by touching the objects with his finger 103 or a dedicated stylus 104. As depicted in FIG. 1, a touch position 105 is detected by the display screen 102, which may be defined, for example, as the center of the contact area between the user's finger and the display screen. A touch area 106 is determined as an area of particular interest around the touch position, for example a number of graphical buttons which might be the target object given the width of the pointing object. If the pointing object is the user's finger, the touch area 106 may be chosen to be relatively large, whereas if the pointing object is a stylus, the touch area 106 may be chosen to be relatively small. The desired size of the touch area may be entered explicitly by the user, or determined automatically, for example by detecting that the stylus is removed from its holder or by detecting the size of the touched area. The chosen size of the touch area 106 may further depend on the number and size of the objects in the neighborhood of the touch position. The larger the number of objects and the smaller their size, the larger the touch area may be taken.

Figure 2:
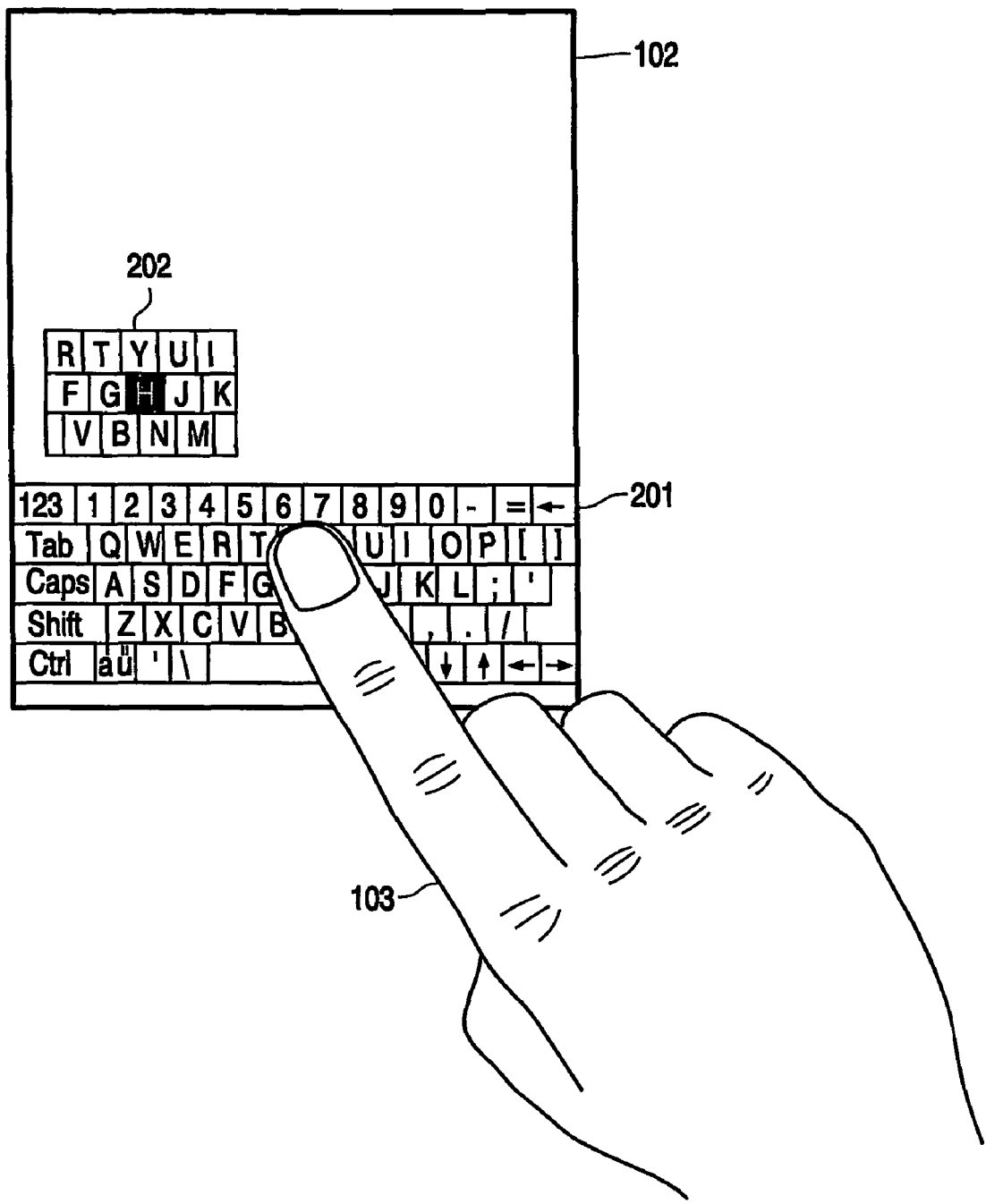
FIG. 2 shows an example of a screen representation according to the invention.

FIG. 2 shows an example of a screen representation in accordance with the invention. The display screen 102 shows a graphical user interface comprising a virtual keyboard 201 which enables the user to input alphanumeric characters into an interactive software application, such as a word processor or electronic agenda Most buttons are dedicated to a specific character, while a few buttons serve to adapt the virtual keyboard to reflect a different character set, such as capital letters, diacritical characters, or numeric and arithmetic signs. For example, the 'CAP' and 'SHIFT' keys cause characters to be input as capitals, or if no capital is available for a character, e.g. for the '=' sign, input another character, e.g. the '+' sign, which is not accessible via the default keyboard.

As depicted in FIG. 2, the user's finger 103 is used as a pointing object. When touching, it covers a plurality of objects, so the user cannot accurately determine which object is actually selected. This problem is solved in accordance with the invention by providing a representation 202 of the touch area 106 on the display screen 102 at a distance of the touch position 105. In this embodiment, the representation 202 is just a displaced copy of the touch area 106 comprising a subset of the virtual keyboard buttons 201. The button which is currently selected, the 'h' key in FIG. 2, is indicated by, for example, highlighting. This indication of the currently selected object is also performed at the touch position but this is hidden for the user by his own finger. It is thus achieved by the invention that the user can perceive which key will be operated given the current position of his finger, for example, in response to releasing his finger from the display screen 102, and the user may correct his finger's position before releasing if the indicated key is not the intended one. The location of the representation 202 is chosen so as not to disturb the presentation of the virtual keyboard 201, so it is made dependent on the present layout of objects in the graphical user interface. In an alternative embodiment, the representation 202 is in a fixed position, which may be determined by the system or chosen by the user.

Figure 3:
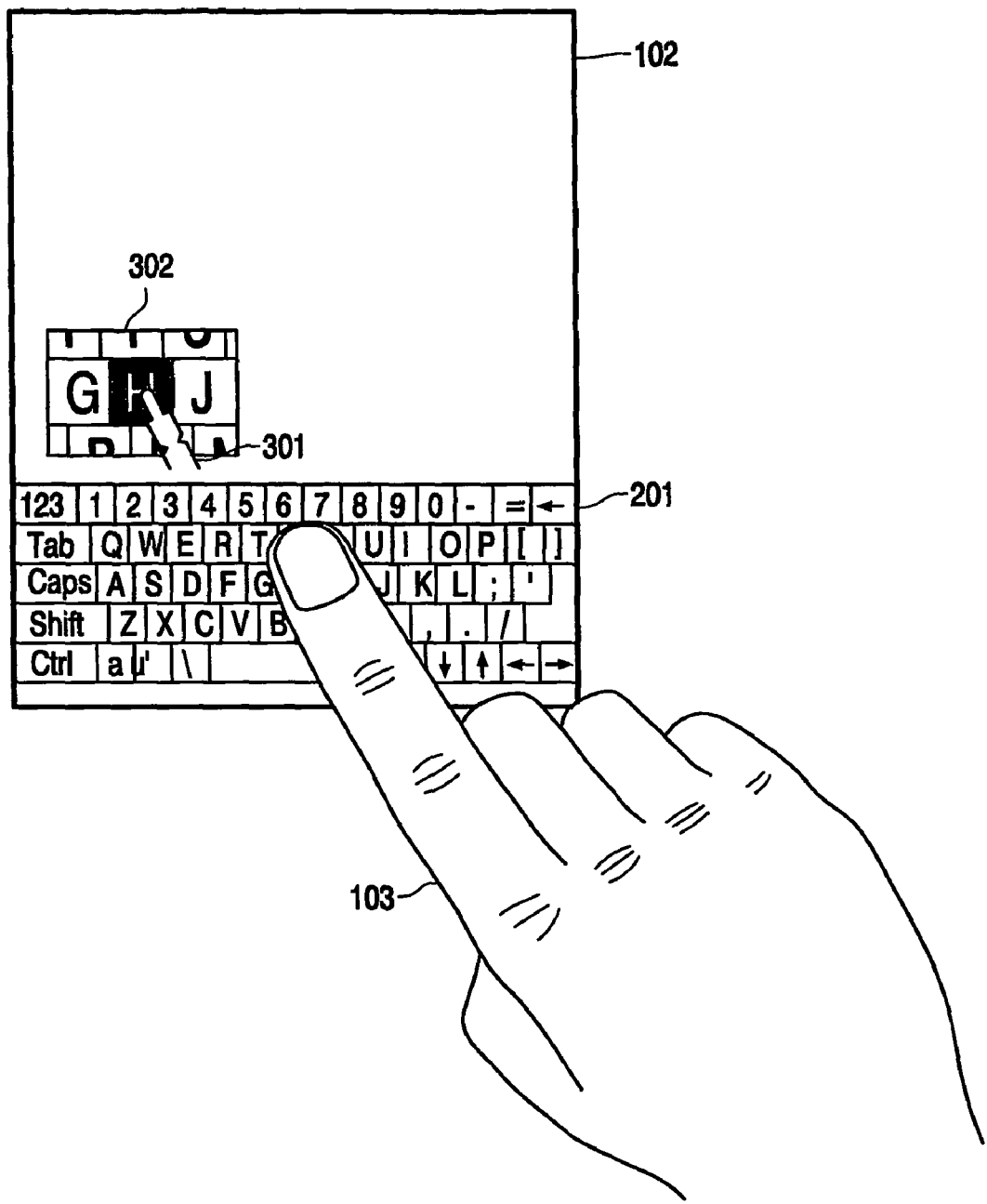
FIG. 3 shows a second example of a screen representation according to the invention.

FIG. 3 shows a further example of a screen representation in accordance with the invention. In this embodiment, a representation 302 comprises an enlarged version of the touch area, thus providing the user with an even better view on the touch area. Again the currently selected button is indicated by e.g. highlighting. The indication of the selected button may be further enhanced by the display of an indication 301 of the pointing object 103. This indication 301 may be independent of the type of pointing object actually used. For example, in FIG. 3, the user's finger 103 is represented by the contours of a stylus, which very accurately indicates the actual touch position as derived by the system from the contact area between the user's finger 103 and the display screen 102. The highlighting of the selected object and the further indication 301 both serve to communicate the touch position to the user, and may be applied in isolation or in combination. In the embodiment as depicted in FIG. 3, the orientation of indication 301 corresponds to the orientation of the used pointing object, which may be derived by the system or set by the user as described hereinbefore.

In FIG. 3, the number of buttons comprised in the representation 302 is smaller than in the non-enlarged representation 202, so as not to disturb the displayed graphical user interface too much. This is, however, a matter of design choice. As described, the user may correct the position of the pointing object 103 before actually operating the selected object. Naturally, the effect of the correction is visible in the representations 202 and 302. A straightforward solution is that the user is not constrained in the extent of his correction, e.g. starting at the right side of the keyboard, the user may drag the pointing object to the left of the keyboard before releasing and thus actually operating the selected object at that moment. During this correction, the objects in the representations 202 and 302 are scrolled accordingly.

In an alternative embodiment, the enlarged representation 302 is combined with a restriction of the extent to which the touch position can be corrected, for example, the initially selected object can be changed to the objects which are comprised in the representation 302. In the example as depicted in FIG. 3, this means that the initially selected 'h' key can be changed to the characters whose corresponding keys are partially or completely visible in the representation 302, e.g. the 'u' key. Consequently, during the correction, the displayed content of the representation 302 does not completely shift along with the pointing object, but only the indication of the selected object and/or the indication of the pointing object may shift relative to the representation 302. This has the advantage that the user can drag the pointing object from the original touch area to the enlarged representation of the original touch area, and make the desired selection in the enlarged representation, which is more convenient when, for example, the user is working in a vibrating vehicle. Other ways of allowing selections in the enlarged representation are, for example, a dedicated control for freezing the content of the representation 302, a delay function which keeps displaying the enlarged representation 302 for a short period of time to enable the user to immediately correct the last input, etc.

Figure 4:
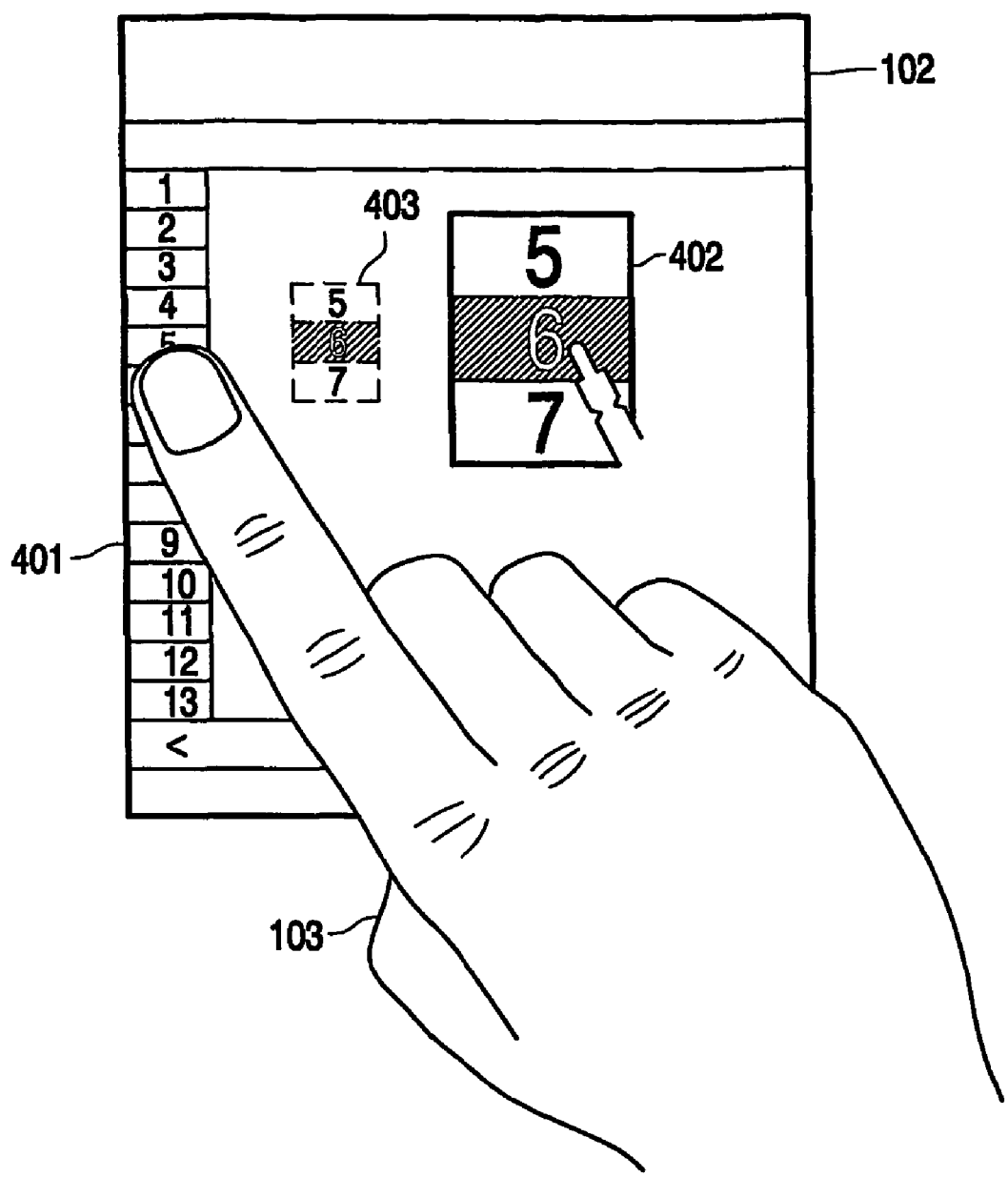
FIG. 4 shows a third example of a screen representation according to the invention.

In FIG. 4, the user intends to operate a respective one of a series of buttons 401 located along the left edge of the display screen 102, for example to select an entire row in a spreadsheet application. In this case, a representation 402 of the touch area 106 is displayed at a position to the right of the touch position, even if the default position is to the left of the touch position. The position of the representation 402 relative to the touch position is thus determined by the touch position.

In an advanced embodiment of the system according to the invention the detection means are further capable of measuring a distance between the pointing object and the display screen. Techniques for measuring a distance between two objects are widely known, and may be based, for example, on capacitance, inductance or electromagnetic field measurements or on the use of (infrared) light sensors. While approaching the display screen 102 with the pointing object 103, intermediate representations 403 may be displayed with properties which may depend on the measured distance between the pointing object 103 and the display screen 102. For example, one such property may be the position of the intermediate representation 403, which might be somewhere between the expected touch position 105 and the final position of the representation 402 which is reached when the pointing object actually touches the screen. Another property might be the size of the intermediate representation 403, which may be increased as the pointing object 103 comes closer to the display screen 102.

In a preferred embodiment, the data processing system comprises a display screen, a graphical user interface for displaying objects on the display screen, and detection means for detecting a touch position of a pointing object on the display screen, wherein the graphical user interface is arranged to display, at a distance of the touch position, a representation of objects displayed in an area around the touch position, and wherein the detection means are further capable of measuring a distance between the pointing object and the display screen, wherein a property of the representation is dependent on the measured distance between the pointing object and the display screen.

In another embodiment the representation is combined with a restriction of the extent to which the touch position can be corrected. This has the advantage that the user may change its pointing position towards the representation which is displayed at a predetermined distance from the original pointing position. In this embodiment, it is not required to measure the distance between the pointing object and the display screen.

While the invention has been described in connection with preferred embodiments, it will be understood that modifications thereof within the principles outlined above will be evident to those skilled in the art, and thus the invention is not limited to the preferred embodiments but is intended to encompass such modifications. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements. 'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements.

A 'computer program' is to be understood to mean any software product stored on a computer-readable medium, such as a floppy-disk, downloadable via a network, such as the Internet, or marketable in any other manner.

The invention claimed is:

1. A data processing system comprising
   a display screen,
   a graphical user interface for displaying objects on the display screen, and
   a detector that is configured to detect a touch position of a pointing object on the display screen,
   the detector being arranged for measuring a distance between the pointing object and the display screen, and
   the graphical interface being arranged for changing a property of the displayed objects in dependence on the measured distance between the pointing object and the display screen.

2. A data processing system as claimed in claim 1, wherein the graphical user interface is arranged for displaying, at a distance from the touch position, a representation of objects displayed in an area around the touch position, and wherein a property of the representation is dependent on the measured distance between the pointing object and the display screen.

3. A data processing system as claimed in claim 1, wherein the displayed objects include a magnified version of the area around the touch position.

4. A data processing system as claimed in claim 1, wherein the displayed objects include an indication of the touch position.

5. A computer readable media that includes a program product that is configured to enable a programmable device when executing said computer program product to function as a system as defined in claim 1.

6. A data processing system as claimed in claim 2, wherein the graphical user interface is arranged for animating the representation for showing a relationship between the representation and the distance between the pointing object and the display screen.

7. A data processing system as claimed in claim 2, wherein the detector is arranged for estimating an expected touch position where the screen is expected to be touched to generate the representation showing an area around the estimated touch position.

8. A data processing system as claimed in claim 2, wherein the position of the representation relative to the touch position is determined by the touch position.

9. A data processing system as claimed in claim 2, wherein the position of the representation is determined by the user.

10. A data processing system as claimed in claim 2, wherein the graphical user interface is arranged for displaying, at the distance from an initial touch position, the representation of the objects displayed in an area around the initial touch position during a predetermined period of time to enable a user to change the initial touch position to a new touch position within the representation.

11. A data processing system as claimed in claim 2, wherein the graphical user interface is arranged for displaying, at the distance from an initial touch position, the representation of the objects displayed in an area around the initial touch position in response to an initially selected object, wherein the initially selected object is allowed to be changed to objects present in the representation only.

12. A data processing system as claimed in claim 2, wherein the representation includes a magnified version of the area around the touch position.

13. A data processing system as claimed in claim 2, wherein the representation includes an indication of the touch position.

14. A data processing system as claimed in claim 7, wherein the graphical user interface is arranged for displaying the representation showing the area around the estimated touch position with initial properties.

15. A data processing system as claimed in claim 14, wherein the graphical user interface is arranged for changing the distance of the representation with respect to the touch position in dependence upon the measured distance between the pointing object and the display screen.

16. A method of enabling a user to interact with a data processing system, the method comprising:
   displaying objects on a display screen,
   detecting a touch position of a pointing object on the display screen,
   measuring a distance between the pointing object and the display screen, and
   changing a property of the displayed objects dependent on the measured distance between the pointing object and the display screen.

17. A method as claimed in claim 16, wherein the method further includes displaying, at a distance from the touch position, a representation of objects displayed in an area around the touch position, and wherein a property of the representation is dependent on the measured distance between the pointing object and the display screen.

* * * * *